(12) United States Patent
Öman

(10) Patent No.: US 10,425,665 B2
(45) Date of Patent: *Sep. 24, 2019

(54) SYSTEM AND METHOD FOR EARLY MEDIA BUFFERING USING DETECTION OF USER BEHAVIOR

(71) Applicant: SPOTIFY AB, Stockholm (SE)

(72) Inventor: Andreas Öman, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,665

(22) Filed: Oct. 27, 2016

(65) Prior Publication Data
US 2017/0048563 A1  Feb. 16, 2017

Related U.S. Application Data

(63) Continuation of application No. 14/485,529, filed on Sep. 12, 2014, now Pat. No. 9,510,024.

(51) Int. Cl.
| | |
|---|---|
| *H04N 21/437* | (2011.01) |
| *H04N 21/8545* | (2011.01) |
| *H04N 21/2183* | (2011.01) |
| *H04N 21/234* | (2011.01) |
| *H04N 21/472* | (2011.01) |

(Continued)

(52) U.S. Cl.
CPC ..... *H04N 21/23406* (2013.01); *H04L 47/722* (2013.01); *H04L 65/60* (2013.01); *H04L 67/22* (2013.01); *H04N 21/2183* (2013.01); *H04N 21/2393* (2013.01); *H04N 21/2407* (2013.01); *H04N 21/437* (2013.01); *H04N 21/44218* (2013.01); *H04N 21/44222* (2013.01); *H04N 21/4667* (2013.01); *H04N 21/47202* (2013.01);

(Continued)

(58) Field of Classification Search
CPC ......... H04N 21/23406; H04N 21/2183; H04N 21/2393; H04N 21/2407; H04N 21/437; H04N 21/44218; H04N 21/44222; H04N 21/4667; H04N 21/47202; H04N 21/8545; H04L 47/722; H04L 67/22; H04L 65/60
USPC ...................................................... 725/110
See application file for complete search history.

(56) References Cited

U.S. PATENT DOCUMENTS

| | | |
|---|---|---|
| 6,671,424 B1 | 12/2003 | Skoll et al. |
| 8,949,871 B2 | 2/2015 | Chai et al. |
| 9,148,702 B1 | 9/2015 | Ko et al. |
| 9,510,024 B2 | 11/2016 | Öman |

(Continued)

*Primary Examiner* — Nathan J Flynn
*Assistant Examiner* — Caroline Somera
(74) *Attorney, Agent, or Firm* — Tucker Ellis LLP

(57) ABSTRACT

A system and method for early media buffering using prediction of user behavior. In accordance with an embodiment, a client device user interface displays a plurality of media options, each of which is associated with a corresponding media content, for example a media channel or video stream, that can be received from a media server system for playing at the device, or at a controlled device. While the user interacts with the user interface, media content associated with regions of the interface can be buffered in preparation for selection and subsequent playing. The client device can include a user interaction sensor, for example a motion, hand/proximity, or heat sensor, which detects when a user is about to interact with the device. The media server system can be triggered to buffer media content associated with one or more neighboring media options on the user interface, in preparation for selection and playing.

21 Claims, 15 Drawing Sheets

(51) Int. Cl.
  *H04N 21/442* (2011.01)
  *H04N 21/239* (2011.01)
  *H04N 21/466* (2011.01)
  *H04N 21/24* (2011.01)
  *H04L 12/925* (2013.01)
  *H04L 29/06* (2006.01)
  *H04L 29/08* (2006.01)
  *H04N 21/20* (2011.01)

(52) U.S. Cl.
  CPC ... *H04N 21/8545* (2013.01); *H04N 2021/225* (2013.01)

(56) References Cited

U.S. PATENT DOCUMENTS

| | | | |
|---|---|---|---|
| 2003/0110503 A1* | 6/2003 | Perkes | H04N 7/17318 |
| | | | 725/86 |
| 2011/0298967 A1 | 12/2011 | Clavin et al. | |
| 2011/0306304 A1 | 12/2011 | Forutanpour et al. | |
| 2012/0278722 A1 | 11/2012 | Raleigh et al. | |
| 2012/0289147 A1* | 11/2012 | Raleigh | H04L 67/2847 |
| | | | 455/3.06 |
| 2013/0022119 A1* | 1/2013 | Chien | H04N 19/159 |
| | | | 375/240.16 |
| 2013/0080968 A1 | 3/2013 | Hanson et al. | |
| 2013/0311411 A1* | 11/2013 | Senanayake | G06F 3/013 |
| | | | 706/13 |
| 2014/0282281 A1* | 9/2014 | Ram | G06Q 30/0251 |
| | | | 715/863 |
| 2014/0289627 A1 | 9/2014 | Brockmann et al. | |
| 2015/0243329 A1* | 8/2015 | Hadorn | H04N 21/44209 |
| | | | 386/230 |

* cited by examiner

SYSTEM AND METHOD FOR EARLY MEDIA BUFFERING USING DETECTION OF USER BEHAVIOR

CLAIM OF PRIORITY AND CROSS-REFERENCE TO RELATED APPLICATIONS

This application claims the benefit of priority to U.S. Patent Application titled "SYSTEM AND METHOD FOR EARLY MEDIA BUFFERING USING DETECTION OF USER BEHAVIOR", application Ser. No. 14/485,529, filed Sep. 12, 2014; and is related to U.S. Provisional Patent Application titled "SYSTEM AND METHOD FOR SWITCHING BETWEEN MEDIA STREAMS WHILE PROVIDING A SEAMLESS USER EXPERIENCE", Application No. 61/836,079, filed Jun. 17, 2013; and U.S. Provisional Patent Application titled "SYSTEM AND METHOD FOR SWITCHING BETWEEN MEDIA ITEMS IN A PLURALITY OF SEQUENCES OF MEDIA ITEMS", Application No. 61/892,343, filed Oct. 17, 2013; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to means of providing digital media content, for example music or videos, in a networked environment, and are particularly related to a system and method for early media buffering using prediction of user behavior.

BACKGROUND

The digital media industry has evolved greatly within the past several years, with consumers (users) now generally able to access large amounts of media content, for example music or videos, at any location or time of day, using a wide variety of computing systems, handheld entertainment devices, smartphones, or other types of media device.

Digital media content can be delivered to users by different means. For example, a user can download various media items, such as individual songs or movies, to a particular device, for later offline playback at that device. Alternatively, a user can listen to, or view, streams of media content provided as channels that are being broadcast in realtime to multiple devices, in a manner similar to broadcast radio and television, or cable television.

Advances in computer network technology have increased the speed and reliability with which media content can be transmitted over networks to individual media devices. This has made it possible for a user to be able to select particular media items to be played over a network in an on-demand fashion, rather than requiring the user to tune to a particular channel to receive a predefined broadcast transmission.

Features that enhance the user's ability to switch between different items of media, for example between different media channels, are important aspects of the overall user experience, since any inconvenience may cause the user to be less-inclined to switch between the different items or channels, thereby reducing the user's enjoyment, and also inhibiting the distribution of media content, and related content such as advertisements.

To address this, media content associated with multiple channels or streams of media can be buffered, to better support channel selection and viewing by the user.

However, despite advances in computer networking, some types of media content, such as high-resolution video content, comprise large amounts of data that may ultimately need to be delivered to the playing device. These are generally the types of environments in which embodiments of the invention can be used.

SUMMARY

In accordance with an embodiment, described herein is a system and method for early media buffering using prediction of user behavior. In accordance with an embodiment, a client device user interface displays a plurality of media options, each of which is associated with a corresponding media content, for example a media channel or video stream, that can be received from a media server system for playing at the device, or at a controlled device. While the user interacts with the user interface, media content associated with regions of the interface can be buffered in preparation for selection and subsequent playing. The client device can include a user interaction sensor, for example a motion, hand/proximity, or heat sensor, which detects when a user is about to interact with the device. The media server system can be triggered to buffer media content associated with one or more neighboring media options on the user interface, in preparation for selection and playing.

DETAILED DESCRIPTION

Figure 1:
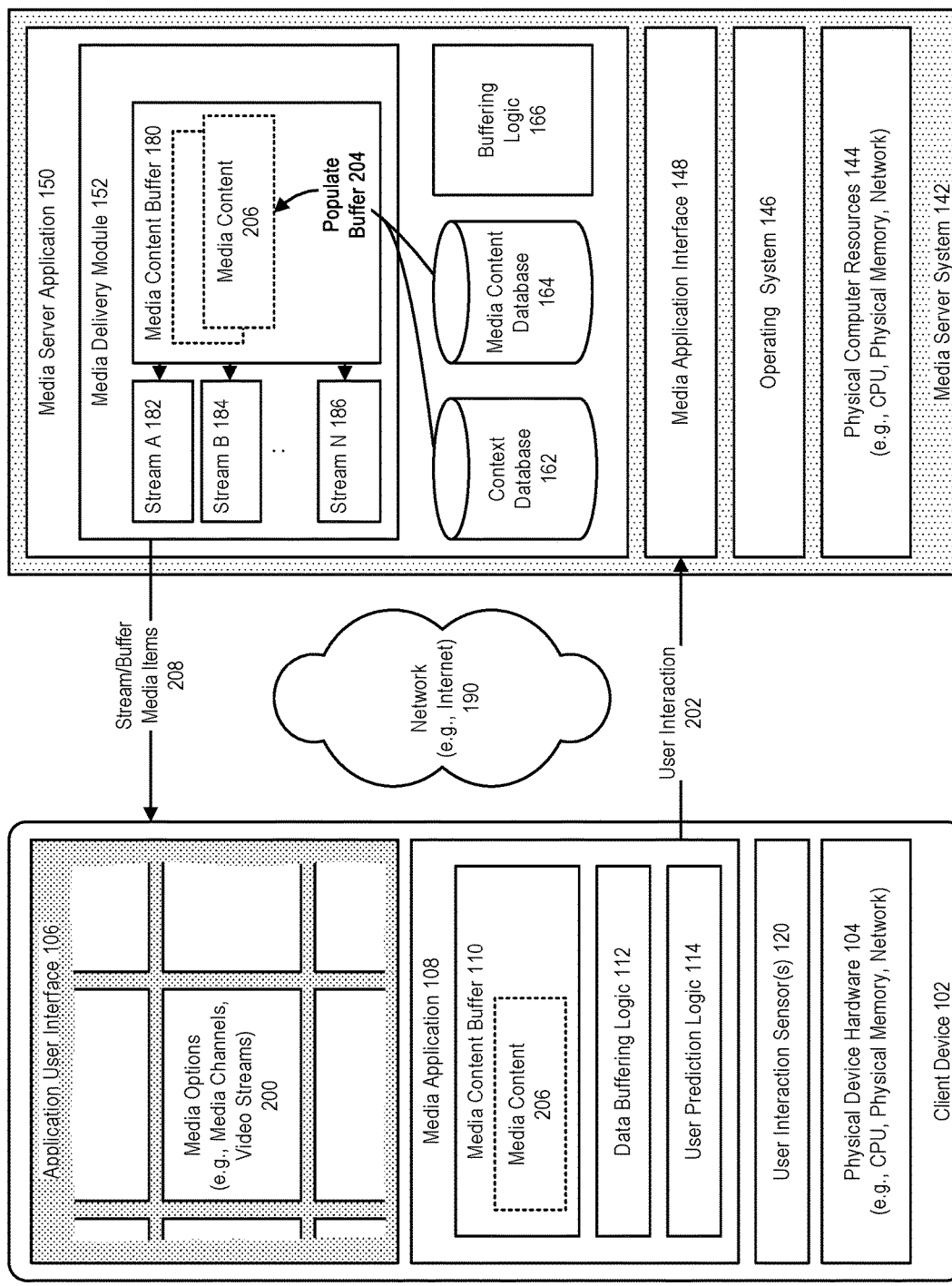
FIG. 1 illustrates a system for early media buffering using detection of user behavior, in accordance with an embodiment.

As described above, advances in computer network technology have increased the speed and reliability with which media content can be transmitted over networks to individual media devices, which has made it possible for a user to be able to select particular media items to be played over a network in an on-demand fashion, rather than requiring the user to tune to a particular channel to receive a predefined broadcast transmission.

Features that enhance the user's ability to switch between different items of media, for example between different media channels, are important aspects of the overall user experience. To address this, media content associated with multiple channels or streams of media can be buffered, to better support channel selection and viewing by the user.

For example, U.S. Provisional Patent Application No. 61/892,343, which is herein incorporated by reference, describes an exemplary environment in which a user interface for selection of media channels of video streams can display a selected video stream and portions of several (e.g., four) adjoining video streams at the same time, while a transition between different media channels takes place.

In such environments, it is useful during selection of a new media channel that the video streams displayed at the sides of a currently selected video stream are up-to-date so that, when the user selects the new channel, there will not be a noticeable jump or disruption in the video stream that has just been selected. For example, when a user initiates a channel selection action, it is preferable if a delay acquiring the adjoining video streams is as short as possible.

However, despite advances in computer networking, some types of media content, such as high-resolution video content, comprise large amounts of data that may ultimately need to be delivered to the playing device. For example, in an environment such as that described above, in order to efficiently utilize available bandwidth, it may be desirable to not buffer all five video streams (i.e., the selected video stream together with its four adjoining neighbors) continuously all of the time, and instead buffer only that video stream of current interest to the user, and/or those streams that are most likely to be of interest in the near future.

To address this, in accordance with an embodiment, described herein is a system and method for early media buffering using prediction of user behavior. In accordance with an embodiment, a client device user interface displays a plurality of media options, each of which is associated with a corresponding media content, for example a media channel or video stream, that can be received from a media server system for playing at the device, or at a controlled client device (controlled device). While the user interacts with the user interface, media content associated with regions of the interface can be buffered in preparation for selection and subsequent playing. The client device can include a user interaction sensor, for example a motion, hand/proximity, or heat sensor, which detects when a user is about to interact with the device. The media server system can be triggered to buffer media content associated with one or more neighboring media options on the user interface, in preparation for selection and playing.

For example, in accordance with an embodiment, when used in an environment such as that described above, in which a user interface for selection of media channels of video streams can display portions of several adjoining video streams at the same time, while a transition between different media channels takes place, early buffering of adjoining video streams can be triggered by use of a motion, hand/proximity, or heat sensor inside a client device. When the user picks up the client device, the sensor triggers early buffering of the adjoining video streams that might be shown at the sides of a selected video stream when the channel selection or switching action then occurs.

FIG. 1 illustrates a system for early media buffering using detection of user behavior, in accordance with an embodiment.

As shown in FIG. 1, in accordance with an embodiment, a client device 102 can be used to receive and play media content that is provided by a media server system 142, or by another system or peer device.

In accordance with an embodiment, the client device can be, for example, a personal computer system, mobile electronic device, handheld entertainment device, wearable computing device, laptop, tablet computer, mobile phone or smartphone, digital media player, or other type of electronic or media device that is able to prepare a media content for presentation, control a presentation of media content, and/or play or otherwise present a media content.

In accordance with an embodiment, each of the client device and the media server system can include, respectively, one or more physical device or computer hardware resources 104, 144, such as one or more processors (CPU), physical memory, network components, or other types of hardware resources.

Although FIG. 1 illustrates a single client device and a single media server system, in accordance with an embodiment, the media server system can support the simultaneous use of multiple client devices, while the client device can be used to access media content provided by multiple media server systems.

In accordance with an embodiment, each client device can also, in some instances, act as a media server system, to share media content stored at that client device with another client device in a peer-to-peer manner.

Client Device

As described above, in accordance with an embodiment, the client device can be, for example, a personal computer system, handheld entertainment device, smartphone, digital media player, or other electronic or media device that is able to prepare, control, and/or play a media content.

As further shown in FIG. 1, in accordance with an embodiment, the client device can include an application user interface 106, which is adapted to display or otherwise provide a visual array of media options, for example as a two-dimensional array of media tiles, or other format, and to determine a user interaction or input.

In accordance with an embodiment, selecting a particular media option, for example a particular media tile, can be used as a request or instruction by the user and/or client device to the media server system to stream or otherwise return a corresponding particular item of media content.

For example, in accordance with various embodiments, the media server system can be used to stream or otherwise communicate music, video, or other forms of media content to the client device, wherein the user interface at the client device is adapted to display a plurality of video titles, or video streams, that correspond to music or videos (e.g., movies or television shows) stored as media items in a database or repository at the media server system.

In accordance with an embodiment, the client device can include a media application 108, together with a media content buffer 110, data buffering logic 112, and user prediction logic 114, which can be used to control the playing of media content received from the media server system, for playing at the client device, or at a controlled device, as described in further detail below.

In accordance with an embodiment, the data buffering logic together with the media content buffer enables a portion of each media item, or a sample or snippet thereof, to be pre-buffered at the client device, as determined by the user prediction logic.

In accordance with an embodiment, while media options are being prepared for display as media tiles, their related media content can be pre-buffered at the same time, allowing for a playing experience that, from the user's perception, seems immediate or seamless.

For example, in accordance with an embodiment, data sent from (or streamed from) a media server system can be stored or cached by a client device in its media content buffer within the memory of the client device, for efficient playing when required.

In accordance with an embodiment, media content stored in the media content buffer can be removed after the media content has been played or otherwise presented by the client device, allowing new media content data to be thereafter stored in the media content buffer. In some instances, media content stored in the media content buffer can be retained for a predetermined amount of time after the content has been played or otherwise presented by the client device, or until other a predetermined condition has been satisfied. For example, in accordance with an embodiment, media content can be stored in the media content buffer until the media content corresponding to a selected media tile has been played to its end (for example, to the end of a corresponding movie or television show), or until the user or client device switches to playing a media content corresponding to a newly selected media tile.

In accordance with an embodiment, the client device can include a user interaction sensor 120, for example a motion, hand/proximity, or heat sensor, which can be used to indicate that a user is about to interact with the client device. The functioning of such a user interaction sensor is described in further detail below. In accordance with other embodiments, other types of user interaction sensors can be used to indicate an imminent use of the device.

Media Server System

As further shown in FIG. 1, in accordance with an embodiment, the media server system can include an operating system 146 or other processing environment which supports execution of a media server system application 150 that can be used, for example, to stream music, video, or other forms of media content to a client device, or to a controlled device.

In accordance with an embodiment, the media server system can be operated according to and/or provide a subscription-based media streaming service, for which a user can have an associated account and credentials that enable that user's client device(s) to communicate with and receive content from the media server system.

In accordance with an embodiment, a received media control request from a client device can include information identifying a destination client device (e.g., an IP address), to which the media server system should stream or otherwise provide media content in response to processing the media control request.

For example, a user may own multiple client devices that can present media received from a media server system, such as a smartphone and a television. In accordance with an embodiment, the identifying information provided with a media control request can include a unique or semi-unique device identifier, such as an IP address, MAC address, or device name, and identify that the media control request is intended for use with, e.g., the user's television. The media server system can then send the requested media and/or forward the media control request to that television, even if the request originated at, e.g., the user's smartphone.

In accordance with an embodiment, a media application interface 148 can receive requests from client devices or from other systems, to retrieve media content from the server.

In accordance with an embodiment, media items, and/or samples associated with the media items, can be provided, for example, within one or more media content database or repository, or can be received at the media server system from another source.

In accordance with an embodiment, a context database 162 can store data associated with the presentation of media content by a client device, including, for example, a current position within a media content stream that is being presented by the client device, a playlist associated with the media content stream, or previously-indicated user playback preferences.

In accordance with an embodiment, the media server system can transmit a context information associated with a media content stream to a client device that is presenting a particular content stream, so that the context information can be used by the client device, or displayed to the user.

For example, in accordance with an embodiment, when the destination client device to which the media content is being streamed changes (e.g., from a controlling client device to a controlled device), the media server system can transmit context information associated with any active media content to the newly-appointed destination client device, for use by that device in playing the media content.

In accordance with an embodiment, the media content database 164 can include media content, for example music, songs, videos, or movies, together with metadata describing the media content. The metadata can be used to enable users and client devices to search through repositories of media content, to identify and access particular media items.

In accordance with an embodiment, a buffering logic 166 can be used to retrieve or otherwise access media items, and/or the samples associated with the media items, in response to requests from client devices or from other systems, and populate a media content buffer 180 at the media delivery module with streams 182, 184, 186 of corresponding media content data that can then be returned to the requesting device, or to a controlled device.

In accordance with an embodiment, a plurality of client devices, media server systems, and/or controlled devices, can communicate with one another using a network, for example the Internet 190, or another form of network communication, such as, for example a local area network, peer-to-peer connection, or wireless or cellular network.

In accordance with various embodiments, the system can be used to stream or otherwise communicate music, video, or other types of media content, wherein as described above the client user interface can display a menu of media options 200, which correspond to music, video or other media content stored at the media server system, or to media channels or video streams which can be streamed by the media server system.

In accordance with an embodiment, the media content can include samples or snippets of media content that are determined by a media content producer to best reflect a particular media content (e.g., a particular video) created by that content producer. For example, a sample or snippet may be a particularly recognizable portion of a particular video. In accordance with various embodiments, other types of media samples or snippets, or previews, can be used.

User Interaction

In accordance with an embodiment, a user can interact with the application user interface at a client device, and issue requests to access media content, for example the playing of a selected music or video item either at their own client device or at a controlled device; or the streaming of a media channel or video stream either to their own client device or to a controlled device.

For example, as shown in FIG. 1, in accordance with an embodiment, the user's selection of a particular media option can be communicated 202 to the media server system, via the server's media application interface.

In accordance with an embodiment, the media server system can then populate the media content buffer at the server 204, with corresponding media content, 206 including one or more streams of media content data, and thereafter communicate 208 the, e.g., selected music, video, media channel, video stream, or other items of media content, to the user's client device, or to the controlled device as appropriate, where it can be buffered in a media content buffer for playing at the destination device.

In accordance with an embodiment, pre-buffering requests from the client device can also be communicated to the media server system application via the media application interface.

In accordance with an embodiment, at the client device, or at a controlled device, in response to the user's interaction with the user interface, the media application can play the requested media content to the user, for example by playing one or more music or videos, media channels or video stream at the client device or controlled device, as appropriate.

For example, in accordance with an embodiment, media options can be provided on the application user interface as a visual array of media options, for example as a two-dimensional array of media tiles as described above, each of which is associated with a media content, for example a piece of music, video, media channel, video stream. In accordance with an embodiment, each media tile can be associated with a particular visualization, for example a cover art identifying a represented song track, or in the case of a video, media channel, video stream a buffered portion of the corresponding media content, or a sample or snippet thereof.

In accordance with an embodiment, a selected point or region can be moved within the array of media options, to select media contents for playing.

For example, in accordance with an embodiment, the user interface can be a touch-sensitive user interface, which recognizes input in the form of touch, for example the position of a user's finger or a stylus upon the user interface, to determine the selected point or region within the visual array of media options. Similarly, the user interface can determine the selected point or region as it is being moved, in response to a user input, within the visual array of media options.

In accordance with an embodiment, the system can, upon receiving the user input, initialize playing of those media options associated with the selected point or region, or in the case of switching between multiple channels or streams of media, issue a media-change request to change or select a different media channel for playing.

Networked Environment

Figure 2:
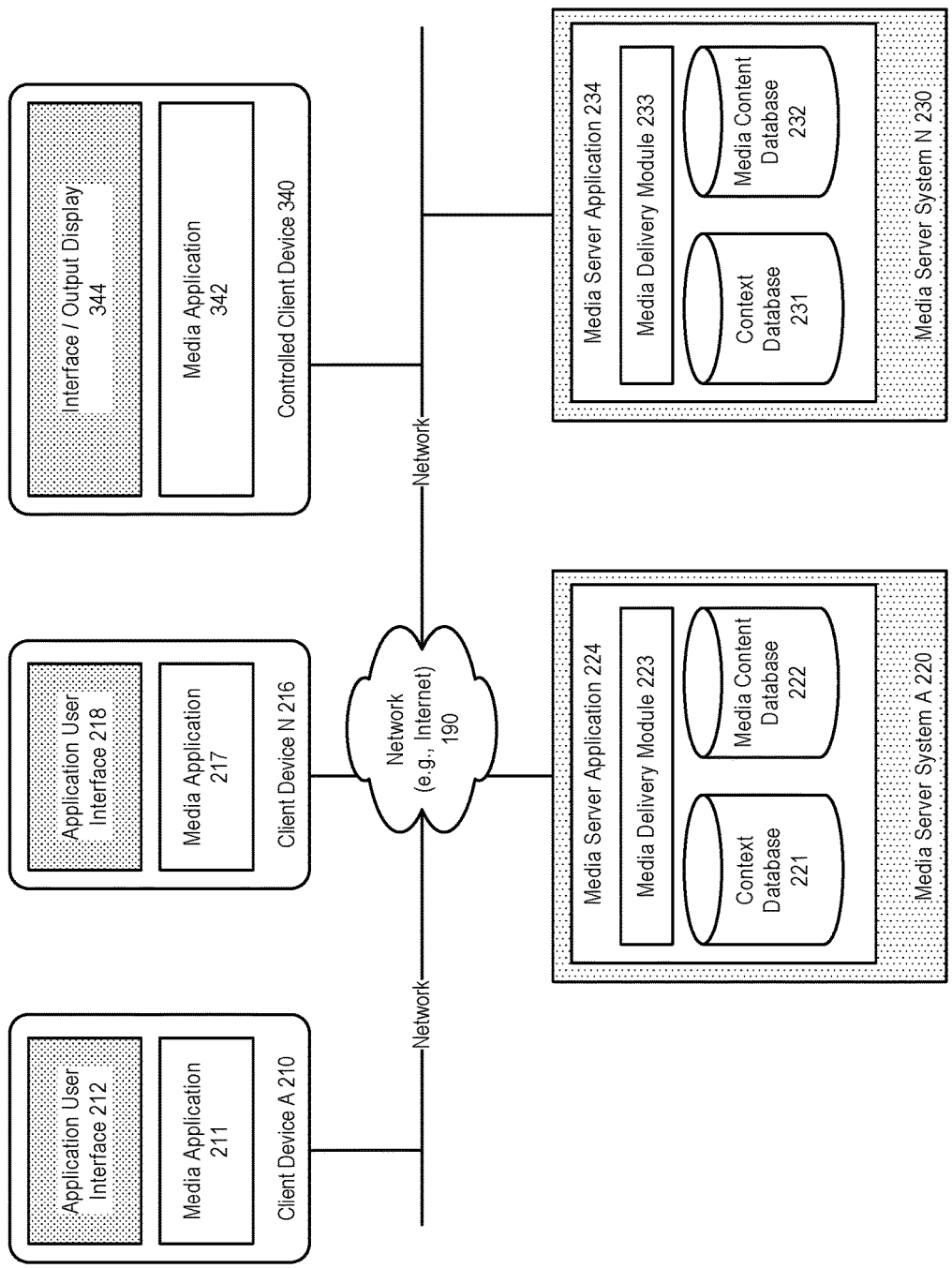
FIG. 2 illustrates a system for early media buffering, including a plurality of client devices and servers, in accordance with an embodiment.

FIG. 2 illustrates a system for early media buffering, including a plurality of client devices and servers, in accordance with an embodiment.

As shown in FIG. 2, in accordance with an embodiment, each of a plurality of media server systems 220, 230 can support the simultaneous use of multiple client devices 210, 216. Similarly, in accordance with an embodiment, each client device can simultaneously access media content, including context databases 221, 231, and media content databases 222, 232, via media server system applications 224, 234, and media delivery modules 223, 233, at multiple media server systems or at other client devices.

In accordance with an embodiment, the plurality of client devices, media server systems, and/or controlled devices, can communicate with one another using a network, for example the Internet or another form of network communication as described above.

In accordance with an embodiment, each client device can include a media application 211, 217, and an application user interface 212, 218, which together can be used to control the playing of media content received from the media server system, for playing either at the client device, or at a controlled device 340 having a media application 342 and an interface or output display 344, for example a suitably equipped television.

In accordance with an embodiment, both a controlling client device and a controlled device can be associated with a common user account, or with several associated user accounts provided by a content provider, with which a media server system is associated.

For example, in accordance with an embodiment, the controlling client device can be provided as a personal computer or a set-top box optionally associated with account credentials, which receives content from the media server system; while the controlled device can be a media presentation device, for example a set of speakers or a television, which receives the content either from the client device and/or from the media server system, and plays or otherwise presents that content to the user.

In accordance with an embodiment, a client device acting as a controlling device or remote control can control a media content presentation at another, controlled device which is distinct from the controlling device.

For example, in some instances, a user can use a client device with a media application to cause the device to act both as a media presentation device and as a remote control for other media presentation devices. This enables a user to control the playing of media content on multiple electronic devices from within a single client device and user interface.

User Interaction/Prediction Cycle

Figure 3:
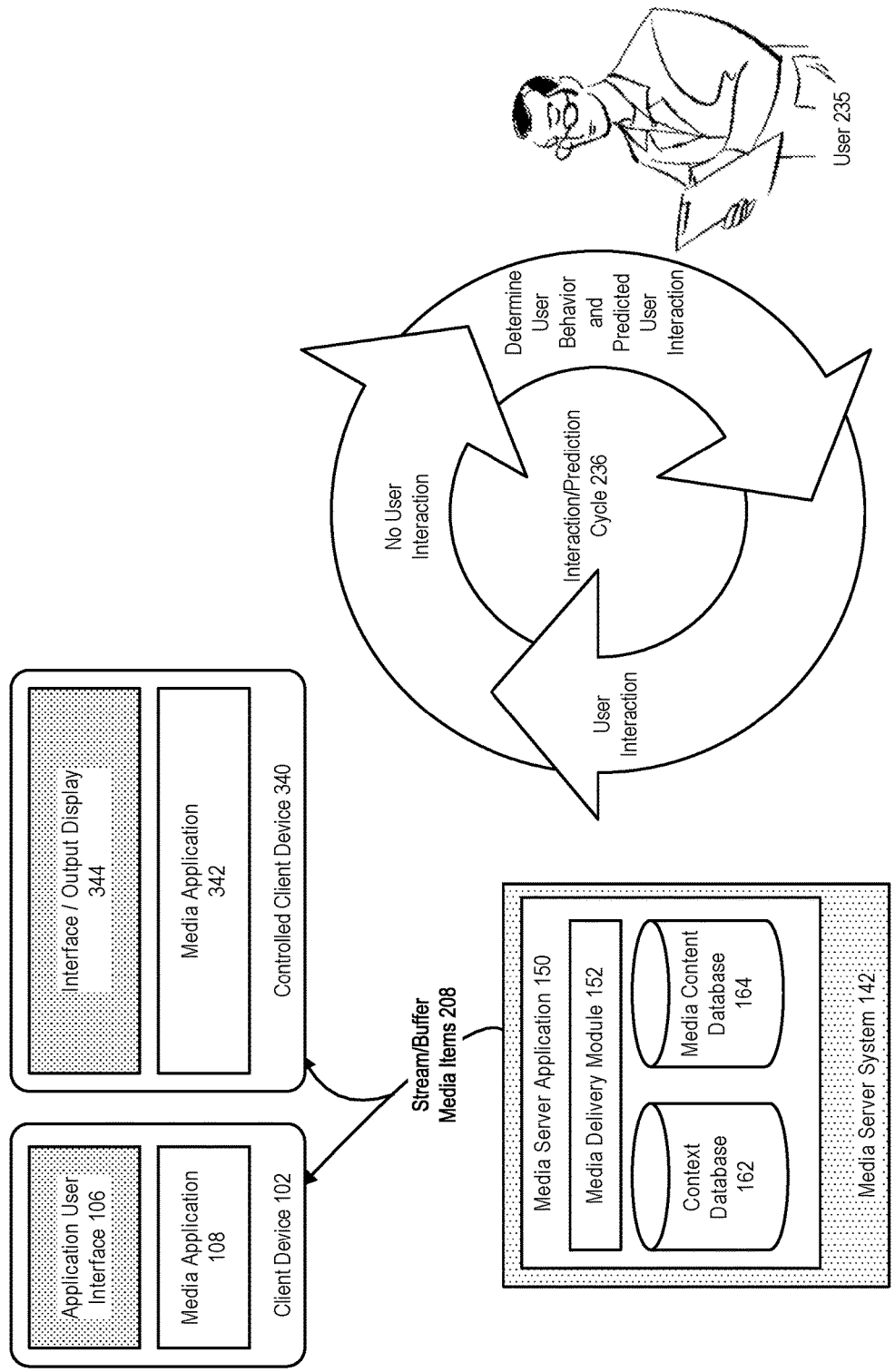
FIG. 3 illustrates early media buffering using detection of user behavior, in accordance with an embodiment.

FIG. 3 illustrates early media buffering using detection of user behavior, in accordance with an embodiment.

As shown in FIG. 3, in accordance with an embodiment, a user 235 can interact with the application user interface and issue requests to access media content, for example the playing of a selected music or video item, either at their own client device or on a controlled device; or the streaming of a media channel or video stream either to their own client device or to a controlled device.

In accordance with an embodiment, a user interaction/prediction cycle 236 can include determining that there is currently no user interaction; determining, based on information from a user interaction sensor, for example a motion, hand/proximity, or heat sensor, that a user is about to interact with the device and predicting their interaction; and, determining any subsequent user interaction and acting accordingly, for example by issuing media control or media-change requests to a media server system.

Early Media Buffering

Figure 4:
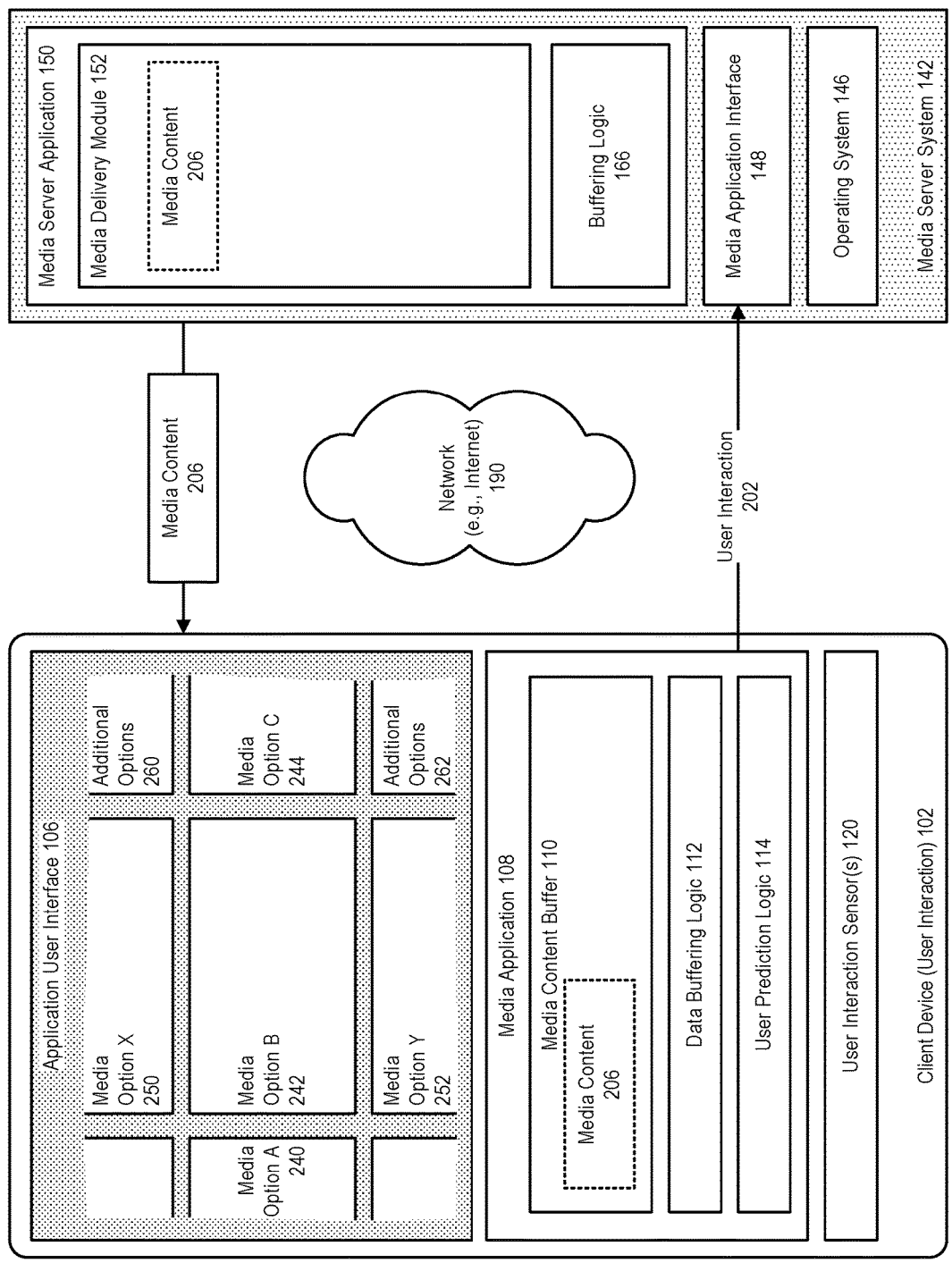
FIG. 4 illustrates a system for early media buffering using detection of user behavior, in accordance with an embodiment.

FIG. 4 illustrates a system for early media buffering using detection of user behavior, in accordance with an embodiment.

As shown in FIG. 4, in accordance with an embodiment, the application user interface is adapted to display or otherwise provide a visual array of media options, for example A 240, B 242, C 244, X 250, Y 252, and additional options 260, 262, for example as a two-dimensional array of media tiles, list, or other visual array format, and to determine a user interaction or input.

In accordance with an embodiment, when a user wants to play items of media content at a particular client device, the user can interact with the device's media application to send a media control request to the media server system. The media server system can receive the media control request over one or more networks.

For example, in accordance with an embodiment, the user can press a button on a touch screen of their client device to send a media control request to the media server system. In accordance with an embodiment, media control requests can include, for example requests to begin presentation of media content by or at a client device, or to control other aspects of the media content that is being presented on client device, for example to pause, skip, or adjust a playing volume of the media content.

Figure 5:
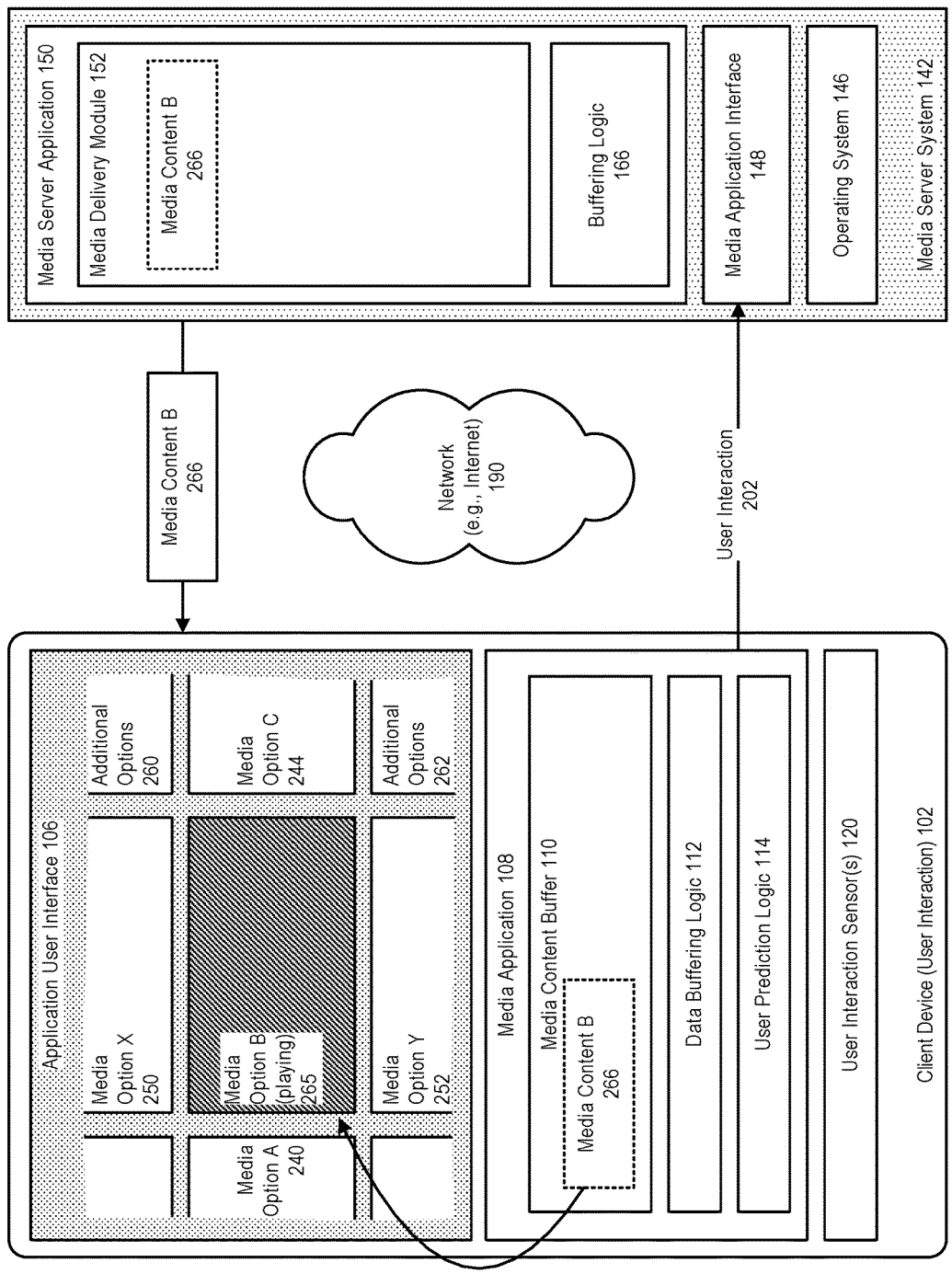
FIG. 5 further illustrates a system for early media buffering using detection of user behavior, in accordance with an embodiment.

FIG. 5 further illustrates a system for early media buffering using detection of user behavior, in accordance with an embodiment. As shown in FIG. 5, in accordance with an embodiment, selecting a particular media option, such as a selected media option B 265, can be used as a request or instruction to the media server system to stream or otherwise return a corresponding particular item of media content.

For example, as shown in the example of FIG. 5, a media channel or video stream content 266 can be buffered in the media content buffer either at the client device, or at a controlled device, or otherwise received from the media server system for playing at the requesting client device, or the controlled device.

Figure 6:
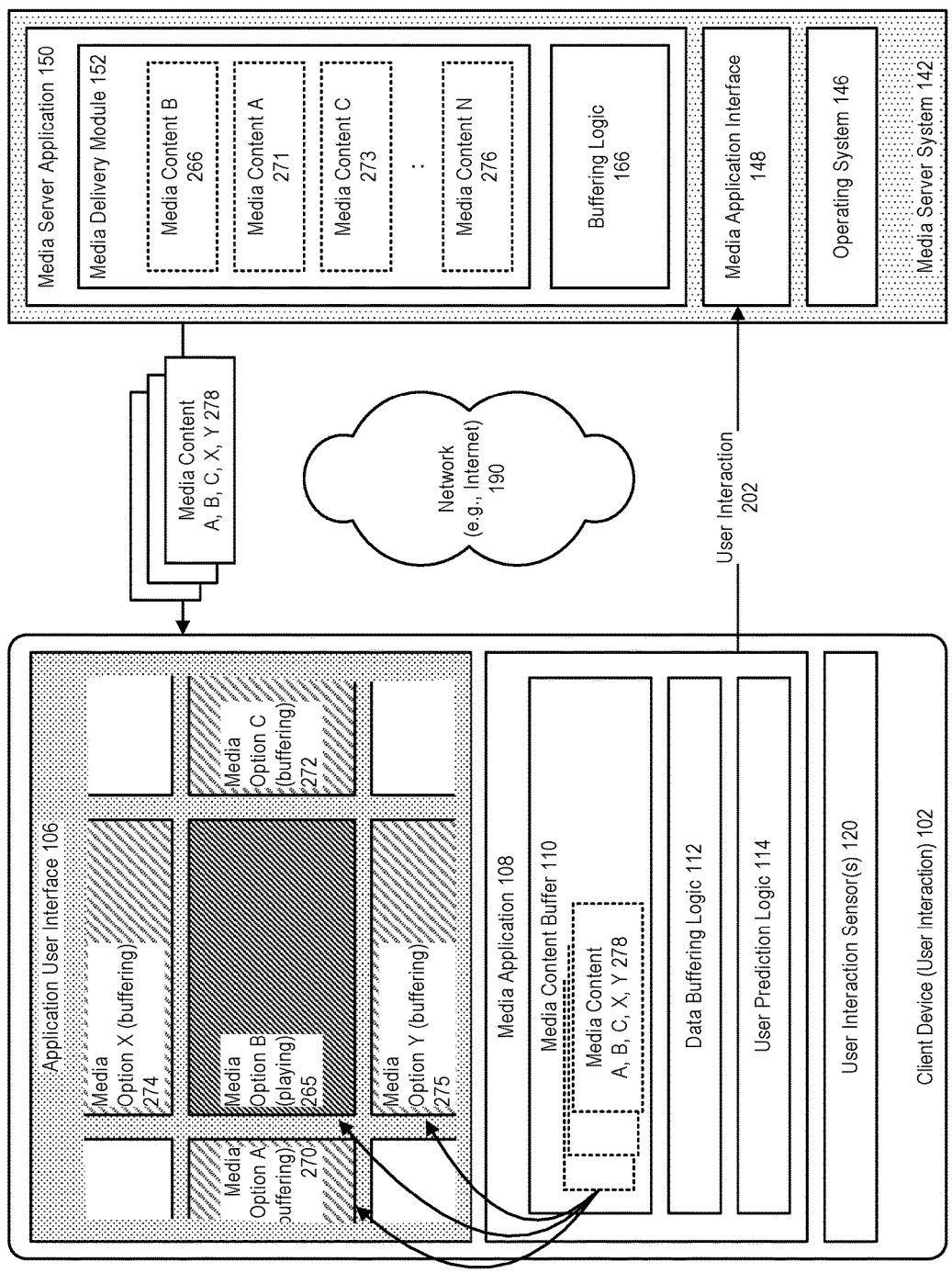
FIG. 6 further illustrates a system for early media buffering using detection of user behavior, in accordance with an embodiment.

FIG. 6 further illustrates a system for early media buffering using detection of user behavior, in accordance with an embodiment. In accordance with an embodiment, in order to help provide a seamless user experience, while the user interacts with the user interface, media content associated with regions of the interface can be buffered in preparation for selection and subsequent playing.

For example, as shown in the example of FIG. 6, while media option B is playing, media channels or video stream content 271, 273, 276 corresponding to its neighboring media options, in this example media options A 270, C 272, X 274 and Y 275, can be buffered in the media content buffer at the client device, or otherwise received 278 from the media server system for playing at the requesting client device, or at a controlled device.

Figure 7:
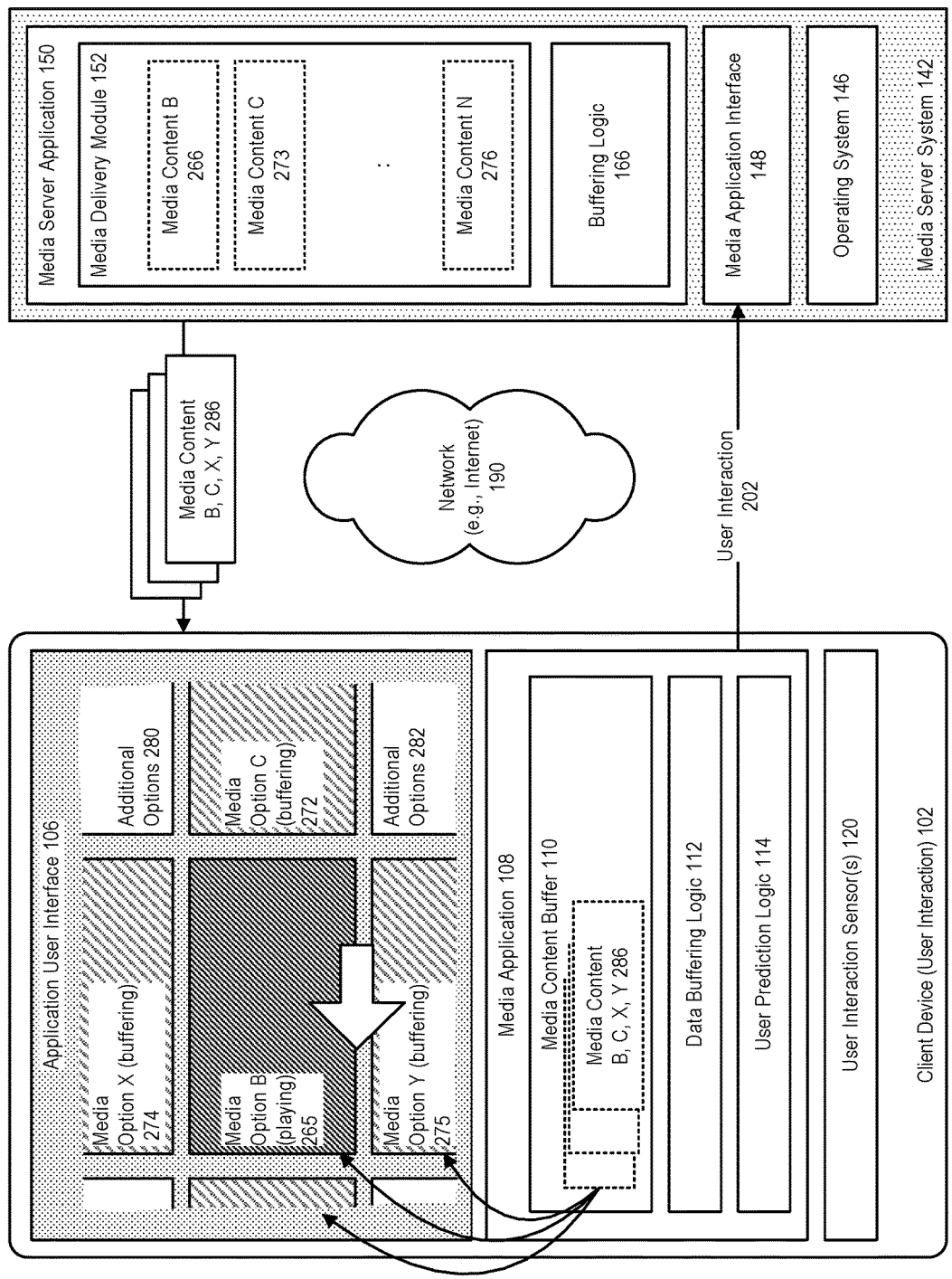
FIG. 7 further illustrates a system for early media buffering using detection of user behavior, in accordance with an embodiment.

FIG. 7 further illustrates a system for early media buffering using detection of user behavior, in accordance with an embodiment. As shown in FIG. 7, while the user interacts with the client device, for example pans the array of media options as illustrated by the arrow, one or more additional media options 280, 282, can be displayed on the user interface.

In accordance with an embodiment, only those media options to the left and right, and above and below the selected media option are buffered, including in this example media content corresponding to media options B, C, X, Y 286.

In accordance with an embodiment, the user interface can display portions of representations of one or more adjacent media items, for example, a representation of a media item to the left of the currently playing media item, and a representation of a media item to the right of the currently playing media item, or those above and below the currently playing media item. For example, the user interface can optionally display representations of media items in adjacent sequences of media items, each including a respective still-image or portion of video content corresponding to the respective media item.

In accordance with an embodiment, the sequences of media items can be represented by media tiles that include a visual representation of their corresponding media items, for example, a recent or relevant or identifying video still, a low-bandwidth video, or information about the corresponding media item represented by the media tile, for example a text information, title, description, user comments, television network distribution brand, or other information that might be useful to the user in browsing and selecting particular media options.

Figure 8:
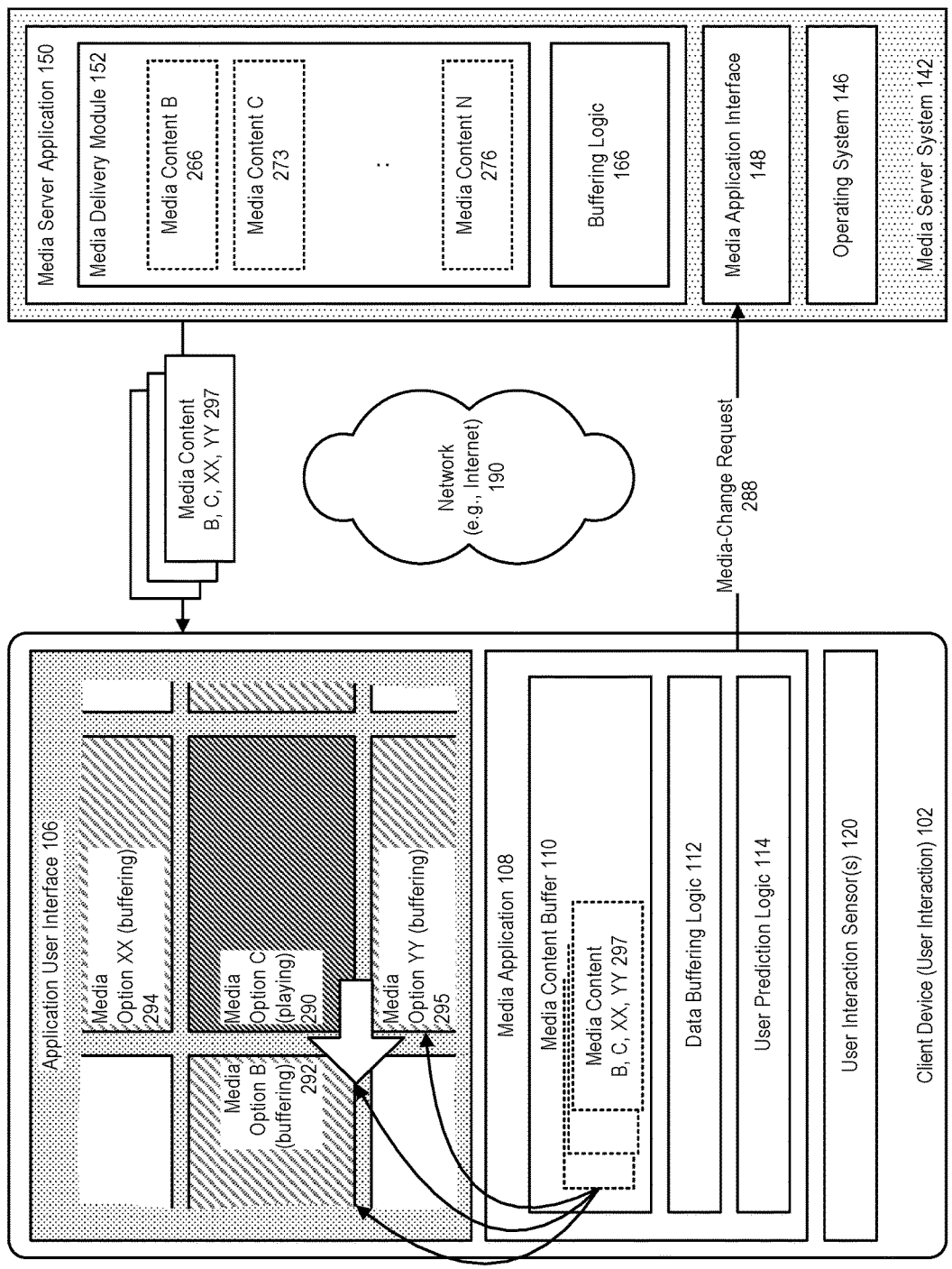
FIG. 8 further illustrates a system for early media buffering using detection of user behavior, in accordance with an embodiment.

FIG. 8 further illustrates a system for early media buffering using detection of user behavior, in accordance with an embodiment. As shown in FIG. 8, while the user further interacts with the client device, for example by continuing to pan the array of media options as illustrated by the arrow, and selects, using a media-change request 288 a different media option to be played, for example media option C 290, then a new set of neighboring or adjacent media options can be displayed on the user interface and buffered 297, in this example media content corresponding to media options B 292, XX 294, and YY 295.

In accordance with an embodiment, while playing the initially-displayed media item in a respective (e.g., central) region of the display, the client device or user interface can detect a media-change input. In accordance with an embodiment, prior to detecting the media-change input, the device can preload at least a portion of one or more media items other than the initially-displayed media item, and in response to detecting the media-change input, display a preloaded portion of one of the media items other than the initially-displayed media item.

For example, in accordance with an embodiment, the client device can request media content corresponding to one of the adjacent media items, before the adjacent media item is requested by a user of the device, so as to improve the responsiveness of the device.

In accordance with some embodiments, not all media content items may be preloaded. For example, in some situations, only the media content corresponding to the right and top media items may be preloaded, while the other adjacent media items are not, reflecting the fact that users are more likely to swipe down and to the left, rather than up and to the right. Additional examples of determining and preloading media items that correspond to adjacent media streams are described in U.S. Provisional Patent Application No. 61/836,079, which is herein incorporated by reference.

However, as described above, despite advances in computer networking, some types of media content, such as high-resolution video content, comprise large amounts of data that may ultimately need to be delivered to the playing device.

For example, in an environment such as that described above, in order to efficiently utilize available bandwidth, it may be desirable to not buffer all of the available adjoining video streams continuously all of the time, and instead buffer only that video stream of current interest to the user, and/or those streams that are most likely to be of interest in the near future.

Figure 9:
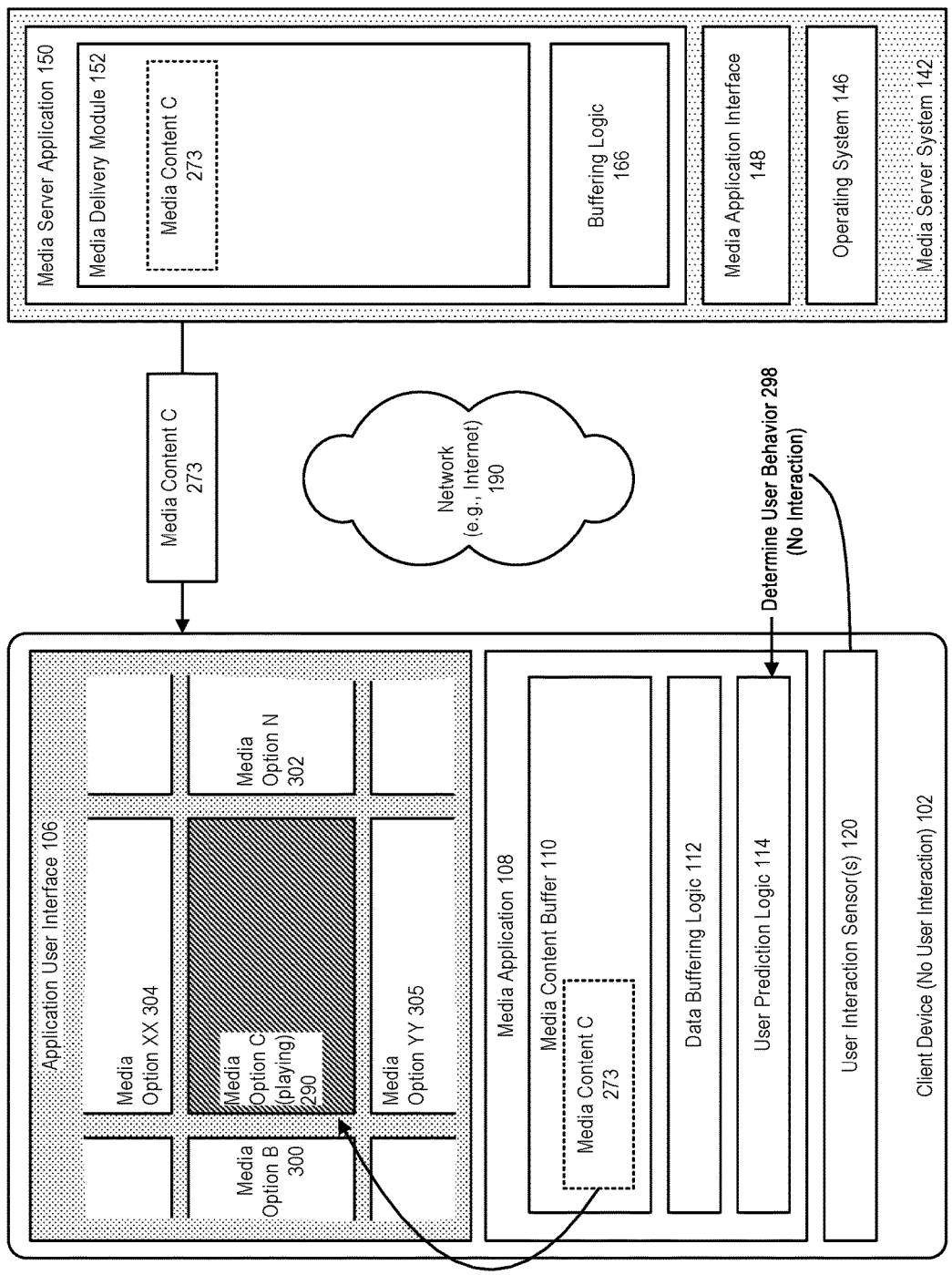
FIG. 9 further illustrates a system for early media buffering using detection of user behavior, in accordance with an embodiment.

FIG. 9 further illustrates a system for early media buffering using detection of user behavior, in accordance with an embodiment.

As shown in FIG. 9, in accordance with an embodiment, the client device can include a user interaction sensor, for example a motion, hand/proximity, or heat sensor, which detects when a user is about to interact with the device.

In accordance with an embodiment, if a determination is made, according to the user interaction sensor, that a user is not about to interact with the client device 298, then the media server system is instructed to buffer media content associated with a restricted number of the media options displayed on the user interface, including the currently selected or playing media option, in this example only media option C. The neighboring media options, in this example B 300, N 302, XX 304, and YY 305 are not buffered.

In accordance with an embodiment, the prediction logic can predict which media tiles may be more likely selected next by the user. For example, in accordance with an embodiment, the client device can present a user interface using a particular language, such as a default language, or a user-selected language. For example, when the respective language is a language that has a left-to-right primary reading direction, such as English, the prediction logic can predict a likely direction to be taken by the user that is different from when the respective language is a language that has a top-to-bottom primary reading direction, such as Japanese or Chinese, and can act accordingly. In accordance with various embodiments, other criteria can be used to determine which media tiles may be more likely selected next by the user.

Figure 10:
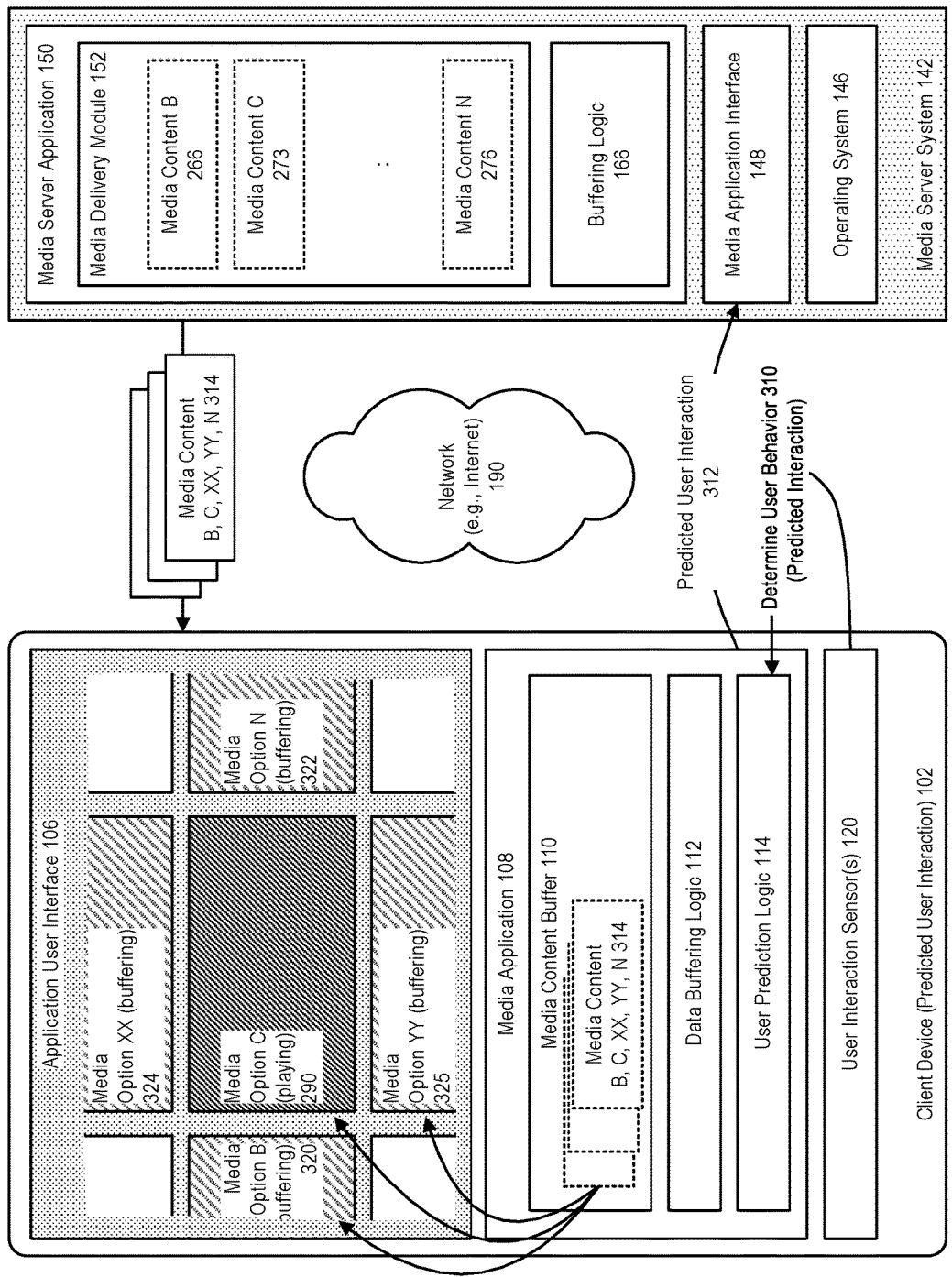
FIG. 10 further illustrates a system for early media buffering using detection of user behavior, in accordance with an embodiment.

FIG. 10 further illustrates a system for early media buffering using detection of user behavior, in accordance with an embodiment. As shown in FIG. 10, if a determination is made, according to the user interaction sensor, that the user is about to interact with the client device 310, then a predicted user interaction is determined, for example that the user may subsequently select one of the adjoining media tiles for playing either at the client device or the controlled device. In accordance with an embodiment, the media server system is then triggered 312 to buffer media content 314 associated with the playing option and one or more neighboring media options as displayed on the user interface, in this example B 320, N 322, XX 324, and YY 325 in preparation for selection by the user.

Remote Control

Figure 11:
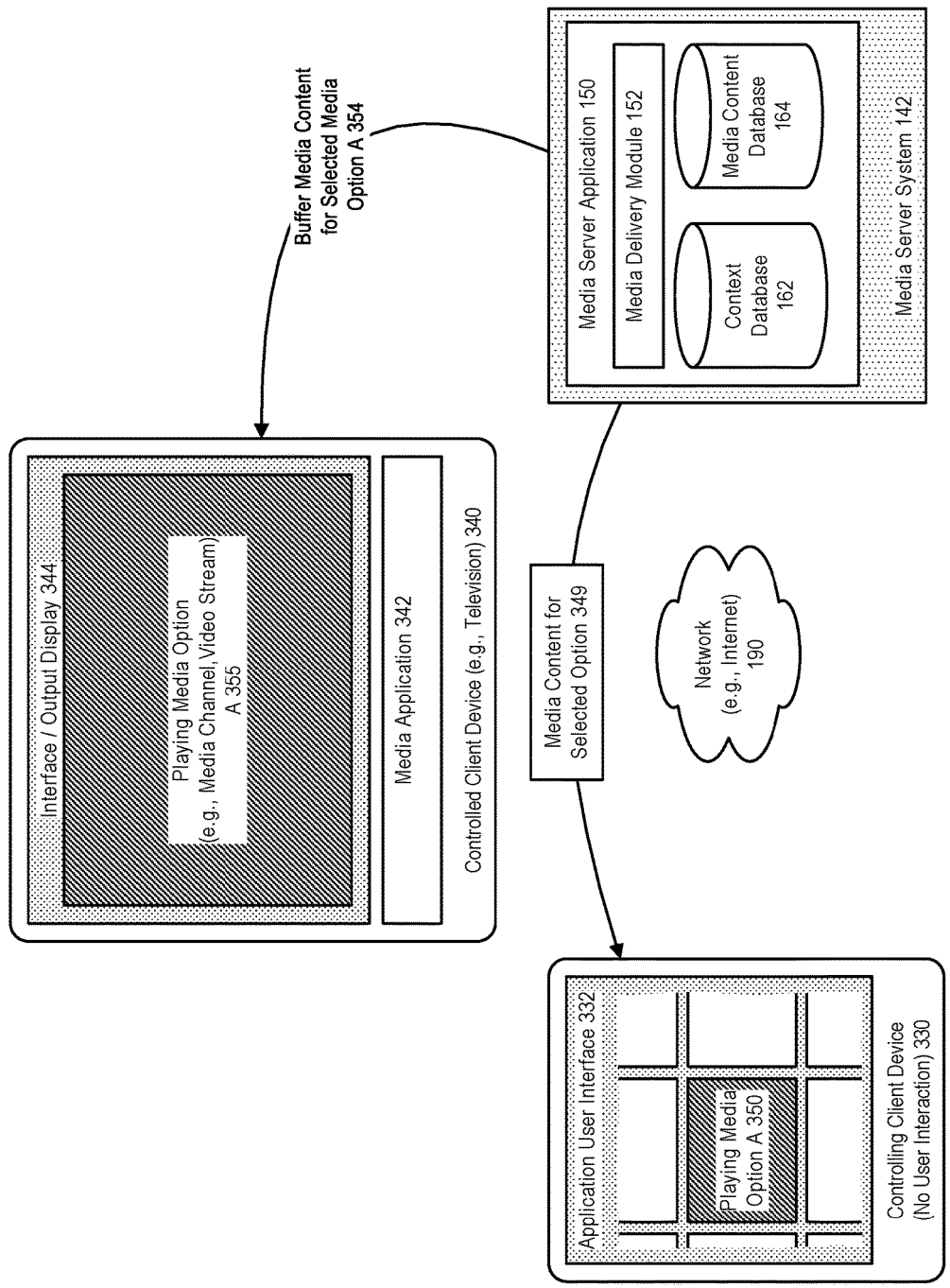
FIG. 11 illustrates an embodiment in which a client device can be used to control the playing of media at another device, in accordance with an embodiment.

FIG. 11 illustrates an embodiment in which a client device can be used to control the playing of media at another device, including early media buffering and detection of user behavior, in accordance with an embodiment.

As shown in FIG. 11, in accordance with an embodiment, a client device 330 having an application user interface 332 can act as a controlling client device, or remote control, to control playing of media content at a controlled device having a media application and an output display or viewing interface, for example a suitably equipped television.

As described above, the client device can include a user interaction sensor, for example a motion, hand/proximity, or heat sensor, which detects when a user is about to interact with the device.

In accordance with an embodiment, a user can interact with the application user interface at the controlling client device and issue requests to access media content at the media server system, for example the playing of a selected music or video item at the controlled device; or the streaming of a media channel or video stream to the controlled device.

For example, as shown in FIG. 11, a user can request that media content can be received 349 and played 350 at the controlling client device, and simultaneously be buffered 354 for playing 355 at the controlled device.

In accordance with an embodiment, if a determination is made, according to the user interaction sensor, that a user is not about to interact with the client device, then the media server system is instructed to buffer media content associated with a restricted number of the media options displayed on the user interface, including the currently selected or playing media option, in this example only media option A.

Figure 12:
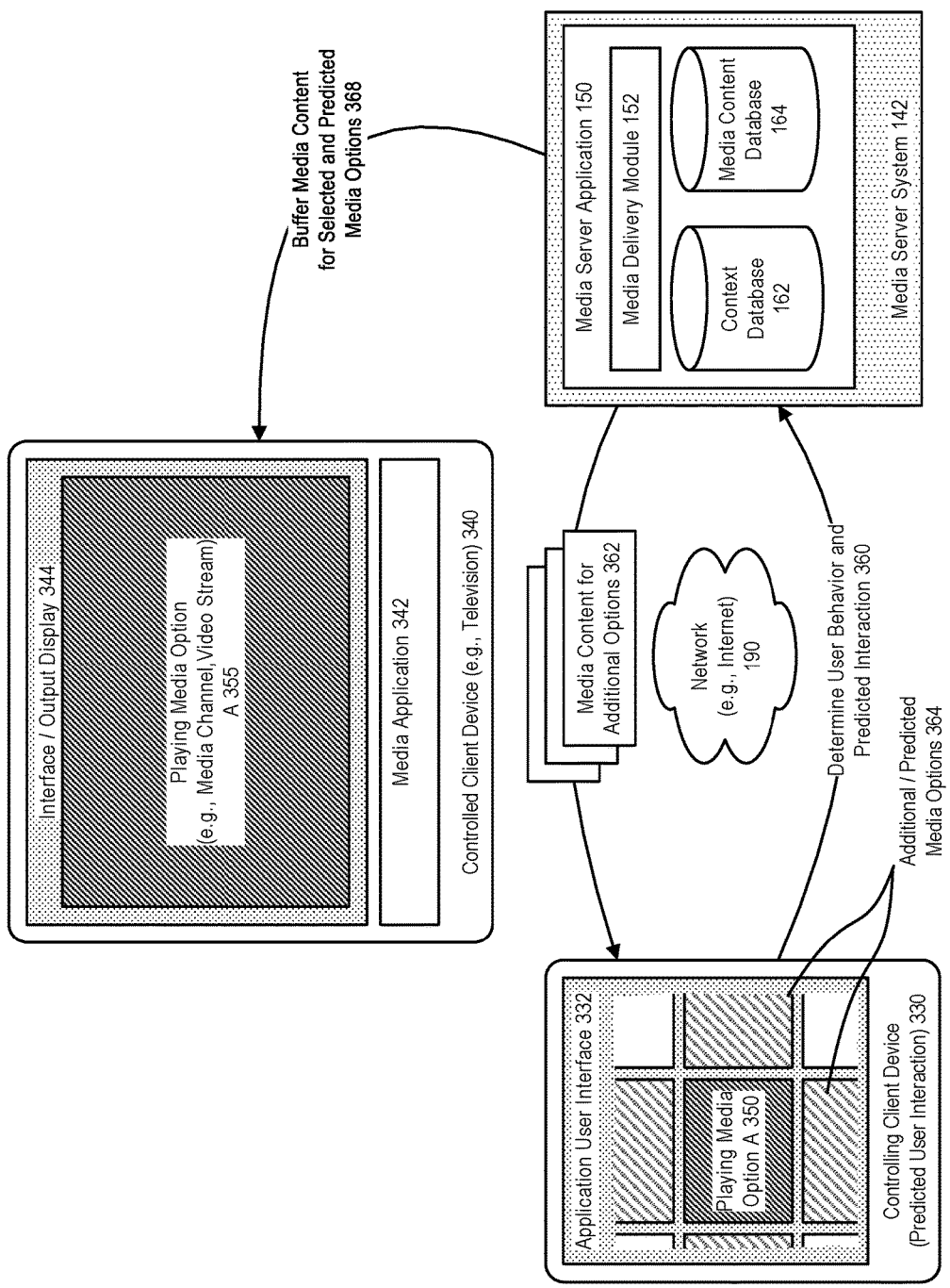
FIG. 12 further illustrates a client device used to control the playing of media at another device, in accordance with an embodiment.

FIG. 12 further illustrates a client device used to control the playing of media at another device, in accordance with an embodiment. As shown in FIG. 12, if a determination is made, according to the user interaction sensor, that the user is about to interact with the client device, for example to control playing of media at the controlled device, then a predicted user interaction is determined, for example that the user may subsequently select one of the adjoining media tiles or media options 364 for playing either at the client device or the controlled device.

In accordance with an embodiment, the media server system is then triggered 360 to buffer media content 362 associated with the playing option and one or more neighboring media options as displayed on the user interface, either at the controlling device and/or also at the controlled device 368, in preparation for selection by the user.

Figure 13:
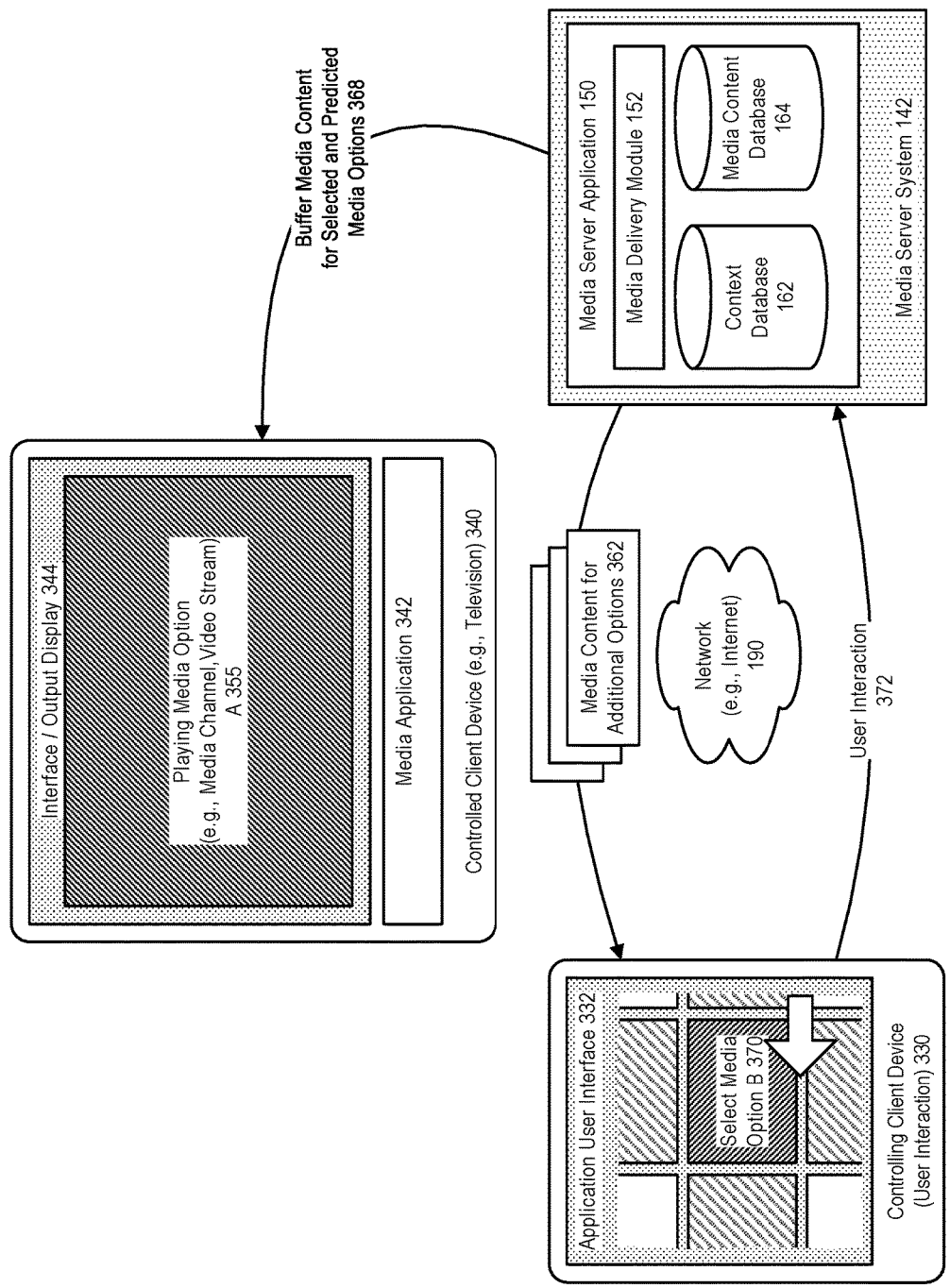
FIG. 13 further illustrates a client device used to control the playing of media at another device, in accordance with an embodiment.

FIG. 13 further illustrates a client device used to control the playing of media at another device, in accordance with an embodiment. As shown in FIG. 13, while the user interacts with the client device, for example by panning the array of options as illustrated by the arrow, the user can select other media options, for example media option B 370, in the manner of previewing its associated media content. User interactions 372, such as media control or media-change requests can be communicated to the media server system.

Figure 14:
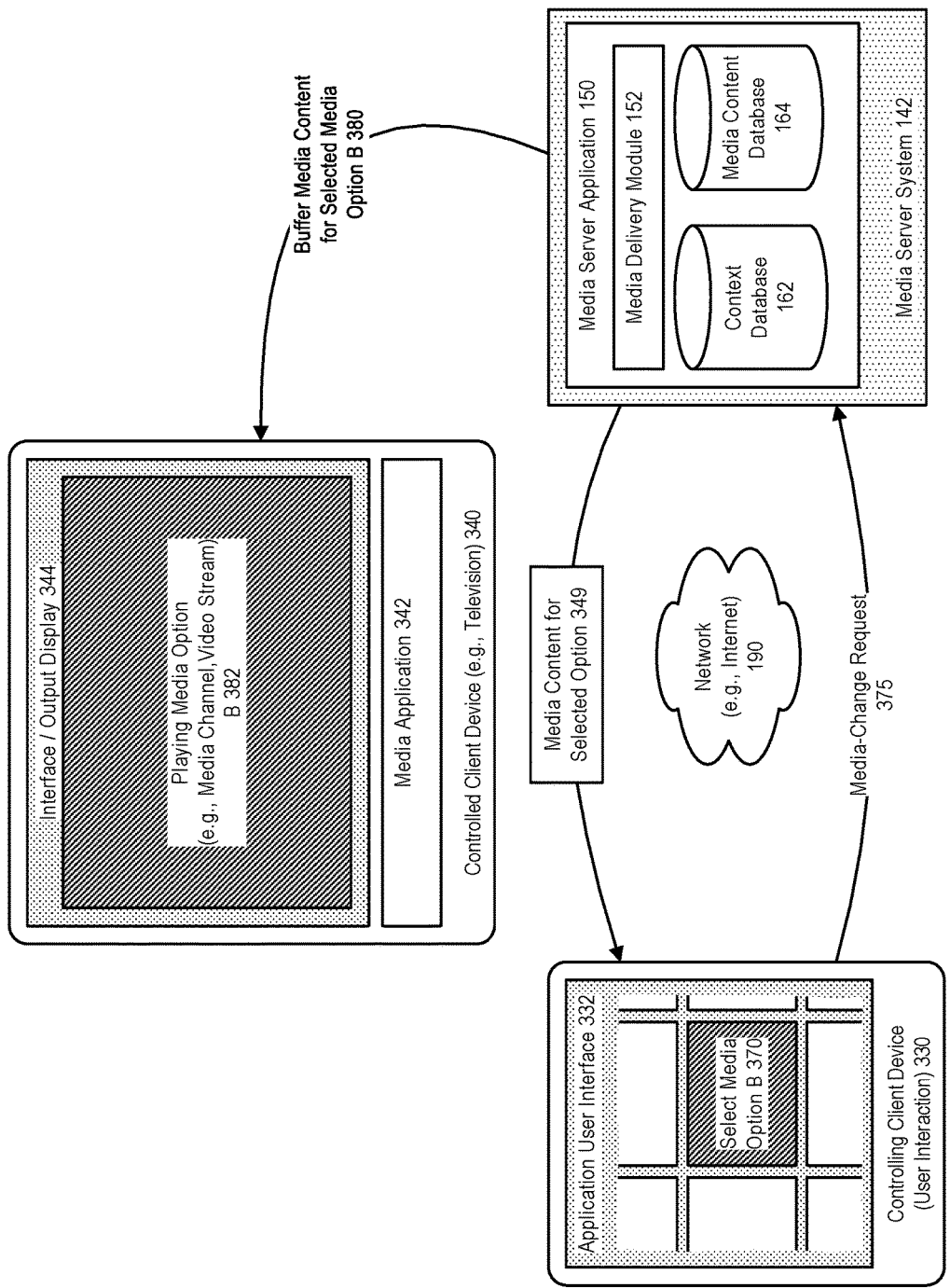
FIG. 14 further illustrates a client device used to control the playing of media at another device, in accordance with an embodiment.

FIG. 14 further illustrates a client device used to control the playing of media at another device, in accordance with an embodiment. As shown in FIG. 14, the user can issue a media-change request 375, e.g., to change a media channel. In response, the media server system can switch the media channel at the controlled device, and thereafter continue to buffer media contents for the switched media option 380, as the controlled device. Since the media has already been buffered, playing of the media option at the controlled device 382 can operate in a seamless manner, with little or no jump or disruption in the video stream that has just been selected.

Process for Early Media Buffering

Figure 15:
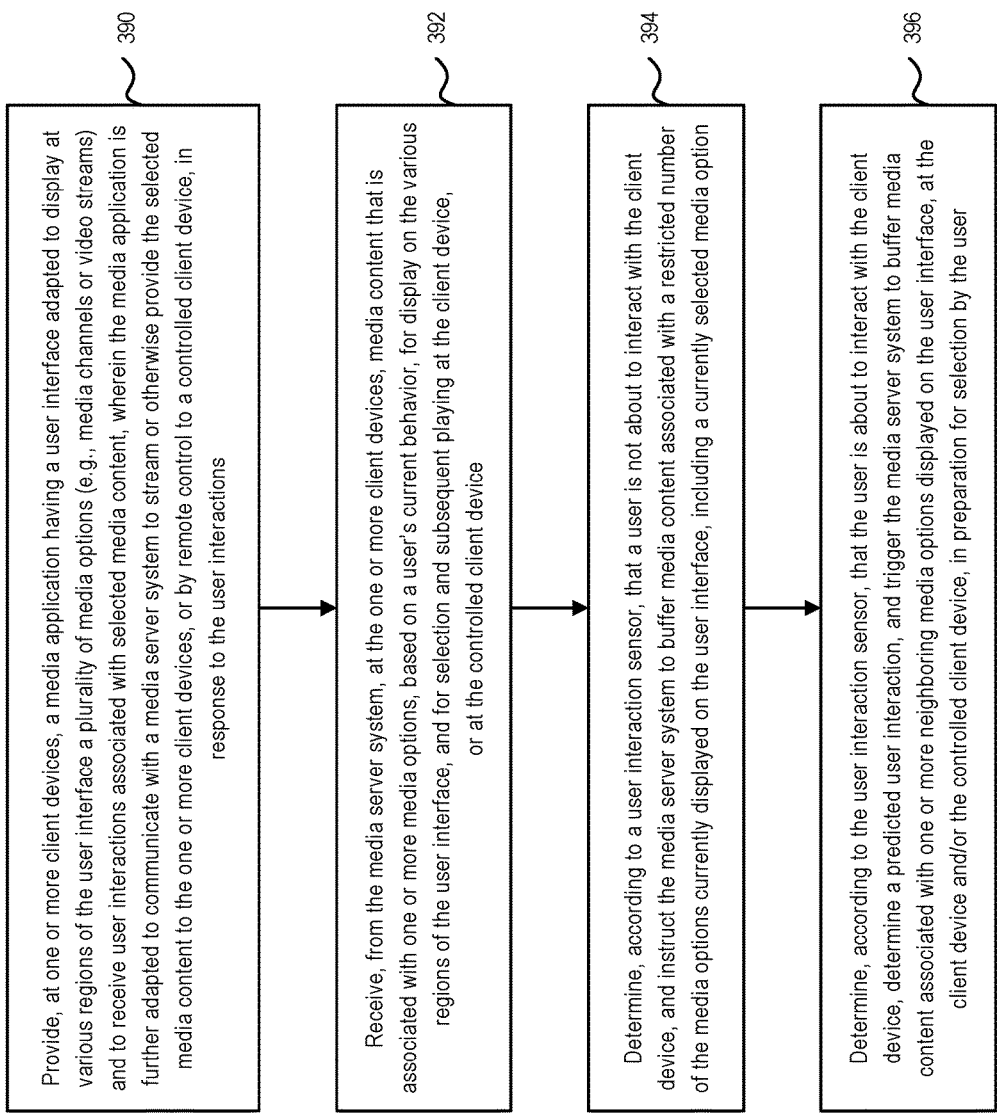
FIG. 15 illustrates a process for early media buffering using detection of user behavior, in accordance with an embodiment.

FIG. 15 illustrates a process for early media buffering using detection of user behavior, in accordance with an embodiment.

At step 390, one or more client devices are provided with a media application having a user interface adapted to display at various regions of the user interface a plurality of media options (for example, media channels or video streams) and to receive user interactions associated with selected media content. The media application is further adapted to communicate with a media server system to stream or otherwise provide the selected media content to the one or more client devices, or by remote control to a controlled device, in response to the user interactions.

At step 392, the one or more client devices receive, from the media server system, media content that is associated with one or more media options, based on a user's current behavior, for display on the various regions of the user interface, and for selection and subsequent playing at the client device, or at the controlled device.

At step 394, a determination is made, according to a user interaction sensor (for example, a motion, hand/proximity, or heat sensor), that a user is not about to interact with the client device. The media server system is instructed to buffer media content associated with a restricted number of the media options displayed on the user interface, including a currently selected media option.

At step 396, a determination is made, according to the user interaction sensor, that the user is about to interact with the client device. A predicted user interaction is determined, and the media server system is triggered to buffer media content associated with one or more neighboring media options displayed on the user interface, at the client device and/or the controlled device, in preparation for selection by the user.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for early media buffering using prediction of user behavior, comprising:
   a client device, including a processor;
   an application user interface provided at the client device, which displays a plurality of media options as a visual array of media tiles, each of which media tiles is associated with a corresponding media stream that can be received from a media server system for playing at one or more of the client device, or a controlled device;
   a user interaction sensor provided at the client device, which detects when a user is about to interact with the client device; and
   a user prediction logic provided at the client device, which receives an indication from the user interaction sensor when the user is about to interact with the client device;
   wherein the client device operates to
      determine one or more neighboring media tiles within the visual array of media tiles as one or more media tiles having a likelihood to be selected next, and communicate with the media server system to enable the client device to buffer the corresponding media streams associated with a first set of media tiles within the visual array, including the one or more media tiles having a likelihood to be selected next, in preparation for selection and subsequent playing, and
      in response to receiving an input indicative of panning the visual array of media tiles,
         display one or more additional media options at the user interface as one or more additional media tiles,
         determine one or more of the additional media tiles as having a likelihood to be selected next, and communicate with the media server system to enable the client device to buffer the corresponding media streams associated with a second set of media tiles within the visual array, including at least one of the one or more additional media tiles having a likelihood to be selected next, in preparation for selection and subsequent playing.

2. The system of claim 1, wherein each of the media tiles is associated with a corresponding media channel or video stream that can be selected and received from the media server system for playing at one or both of the client device and the controlled device.

3. The system of claim 1, wherein the user interaction sensor is one or more of a motion, hand/proximity, or heat sensor, which detects when the user picks up the client device and provides the indication when the user is about to interact with the client device.

4. The system of claim 1, wherein the controlled device includes an output display that displays media content, and wherein the client device operates as a remote control, and is adapted to receive a selection from the user of a selected media tile, for subsequent receipt from the media server system and playing at the output display of the controlled device.

5. The system of claim 4, wherein the controlled device displays media channels or video streams on the output display as received from the media server system, and wherein selection from the user of a selected media tile is used as a media-change request to change a media channel at the controlled device.

6. A method for early media buffering using prediction of user behavior, comprising:
providing, at a client device, an application user interface which displays a plurality of media options as a visual array of media tiles, each of which media tiles is associated with a corresponding media stream that can be received from a media server system for playing at one or more of the client device, or a controlled device;
detecting, using a user interaction sensor provided at the client device, when a user is about to interact with the client device;
receiving an indication from the user interaction sensor when the user is about to interact with the client device;
determining one or more neighboring media tiles within the visual array of media tiles as one or more media tiles having a likelihood to be selected next, and communicating with the media server system to enable the client device to buffer the corresponding media streams associated with a first set of media tiles within the visual array, including the one or more media tiles having a likelihood to be selected next, in preparation for selection and subsequent playing; and
in response to receiving an input indicative of panning the visual array of media tiles
displaying one or more additional media options at the user interface as one or more additional media tiles,
determining one or more of the additional media tiles as having a likelihood to be selected next, and
communicating with the media server system to enable the client device to buffer the corresponding media streams associated with a second set of media tiles within the visual array, including at least one of the one or more additional media tiles having a likelihood to be selected next, in preparation for selection and subsequent playing.

7. The method of claim 6, wherein each of the media tiles is associated with a corresponding media channel or video stream that can be selected and received from the media server system for playing at one or both of the client device and the controlled device.

8. The method of claim 6, wherein the user interaction sensor is one or more of a motion, hand/proximity, or heat sensor, which detects when the user picks up the client device and provides the indication when the user is about to interact with the client device.

9. The method of claim 6, wherein the controlled device includes an output display that displays media content, and wherein the client device operates as a remote control, and is adapted to receive a selection from the user of a selected media tile, for subsequent receipt from the media server system and playing at the output display of the controlled device.

10. The method of claim 9, wherein the controlled device displays media channels or video streams on the output display as received from the media server system, and wherein selection from the user of a selected media tile is used as a media-change request to change a media channel at the controlled device.

11. A non-transitory computer readable storage medium, including instructions stored thereon which when read and executed by one or more computers cause the one or more computers to perform steps comprising:
providing, at a client device, an application user interface which displays a plurality of media options as a visual array of media tiles, each of which media tiles is associated with a corresponding media stream that can be received from a media server system for playing at one or more of the client device, or a controlled device;
detecting, using a user interaction sensor provided at the client device, when a user is about to interact with the client device; and
receiving an indication from the user interaction sensor when the user is about to interact with the client device;
determining one or more neighboring media tiles within the visual array of media tiles as one or more media tiles having a likelihood to be selected next, and communicating with the media server system to enable the client device to buffer the corresponding media streams associated with a first set of media tiles within the visual array, including the one or more media tiles having a likelihood to be selected next, in preparation for selection and subsequent playing; and
in response to receiving an input indicative of panning the visual array of media tiles,
displaying one or more additional media options at the user interface as one or more additional media tiles,
determining one or more of the additional media tiles as having a likelihood to be selected next, and
communicating with the media server system to enable the client device to buffer the corresponding media streams associated with a second set of media options within the visual array, including at least one of the one or more additional media tiles having a likelihood to be selected next, in preparation for selection and subsequent playing.

12. The non-transitory computer readable storage medium of claim 11, wherein each of the media tiles is associated with a corresponding media channel or video stream that can be selected and received from the media server system for playing at one or both of the client device and the controlled device.

13. The non-transitory computer readable storage medium of claim 11, wherein the user interaction sensor is one or more of a motion, hand/proximity, or heat sensor, which detects when the user picks up the client device and provides the indication when the user is about to interact with the client device.

14. The non-transitory computer readable storage medium of claim 11, wherein the controlled device includes an output display that displays media content, and wherein the client device operates as a remote control, and is adapted to receive a selection from the user of a selected media tile, for subsequent receipt from the media server system and playing at the output display of the controlled device.

15. The non-transitory computer readable storage medium of claim 14, wherein the controlled device displays media channels or video streams on the output display as received from the media server system, and wherein selection from the user of a selected media tile is used as a media-change request to change a media channel at the controlled device.

16. The system of claim 1, wherein determining the one or more media tiles having a likelihood to be selected next includes predicting a direction of a subsequent swipe input.

17. The method of claim 6, wherein determining the one or more media tiles having a likelihood to be selected next includes predicting a direction of a subsequent swipe input.

18. The non-transitory computer readable storage medium of claim 11, wherein determining the one or more media tiles having a likelihood to be selected next includes predicting a direction of a subsequent swipe input.

19. The system of claim 1, further comprising a buffering logic, which enables a portion of each media content item associated with one or more neighboring media tiles displayed to the left, right, above, or below a selected media tile as the one or more media tiles having a likelihood to be selected next, to be pre-buffered as determined by the user prediction logic.

20. The method of claim 6, further comprising pre-buffering a portion of each media content item associated with one or more neighboring media tiles displayed to the left, right, above, or below a selected media tile as the one or more media tiles having a likelihood to be selected next.

21. The non-transitory computer readable storage medium of claim 11, wherein the instructions further cause the one or more computers to pre-buffer a portion of each media content item associated with one or more neighboring media tiles displayed to the left, right, above, or below a selected media tile as the one or more media tiles having a likelihood to be selected next.

* * * * *